Patented June 23, 1936

2,045,411

UNITED STATES PATENT OFFICE 2,045,411

PREPARATION OF SOLUTIONS OF HYDROXY-CELLULOSE ETHERS

George A. Richter and Harold P. Vannah, Berlin, and Douglas H. McMurtrie, Gorham, N. H., assignors to Brown Company, Berlin, N. H., a corporation of Maine No Drawing. Application July 25, 1934, Serial No. 736,902

11 Claims. (Cl. 106—40)

This invention relates to the preparation of solutions of hydroxy-cellulose ethers such as may be used in the manufacture of thin transparent sheets or films, artificial silk filaments, and other ultimates consisting essentially of the solid ether regenerated from solution, and in the coating or impregnation of cloth, felts, papers, or other suitable fabrics or bases wherein the ether appears as a discontinuous or continuous solid phase regenerated from solution.

There are various processes of producing hydroxy-cellulose ethers, one of the most recent and best processes involving reaction between cellulose fiber and alkylene oxides to form hydroxy-alkyl ethers of cellulose that can be made to dissolve under certain conditions in an aqueous caustic soda solution. The ether solution thus prepared can be used, as hereinbefore indicated, in the manufacture of various products, suitable acidic media, such as a sulphuric acid solution of sodium sulphate, being employed to regenerate the solid ether from solution as the solution is, for example, being cast into thin sheets or films, or being spun into filaments, or being formed into other shapes, or after it has been applied as a coating or as an impregnant to cloth, felts, papers, or other suitable fabrics or bases. In all such uses, it is necessary that the ether solution be of a particular ether concentration and that it possess a fluency and stability at such concentration permitting its being fashioned or worked readily into the desired finished product. Thus, in making such finished products as thin sheets or films, artificial silk filaments, or the like, it is generally desired that the solution be of an ether concentration of about 6% to 8% and that it possess good fluency and stability at such concentration.

In preparing an ether solution of the desired qualities, it has heretofore been a preferred practice preliminarily to freeze the ether in admixture with a comparatively dilute caustic soda solution and then to thaw the mixture while it was being mascerated, as it was found that it was thereby possible to form a substantially clear solution of the appropriate ether concentration, fluency, and stability. Thus, it is possible by such practice to dissolve a hydroxyl ethyl ether of cellulose in a caustic soda solution of about 7% to 8% strength to form a substantially clear, fluent and stable solution of about 7% ether concentration such as can be readily worked into such finished products as transparent films and artificial silk filaments. Such practice is especially valuable when applied to hydroxy ethyl ethers of cellulose that have been produced by etherifying cellulose with a comparatively small amount of ethylene oxide, for instance, about 6% to 15% of ethylene oxide, based on the weight of cellulose, as an ether of such low combined ethylene oxide content is much more difficult to dissolve in caustic soda solution than ethers prepared with, say, 30% to 50% or more ethylene oxide, based on the weight of cellulose. Despite the difficulty and expense of dissolving ethers of comparatively low combined ethylene oxide contents, nevertheless, from a manufacturing standpoint it is most desirable to employ such ethers on account of the excessive expense that goes with the higher ethylene oxide usages. Again, ethers of low combined ethylene oxide content once put into solution can be transformed into films, artificial silk filaments, and other finished products having a wet strength frequently much greater than that of products realized from ethers of high combined ethylene oxide content.

We reasoned that a solution of the ether could be effected, without need of freezing and thawing steps, in concentrated caustic soda solution, for instance, in a caustic soda solution of about 18% or greater strength, particularly since the freezing of the ether in a dilute caustic soda solution appears to be accompanied by the separation of water in the form of ice crystals and a progressive increase in concentration in the caustic soda content of the residual or unfrozen water, which, with the increase in the caustic soda concentration therein, evidently causes swelling and rupture of the etherified cellulose, insomuch that the cellulose ether molecule is evidently broken down or depolymerized to a point where, upon thawing the mixture, it goes readily into solution. In an attempt to simulate the conditions that were thought to exist in a frozen mixture of cellulose ether and caustic soda solution, we mixed cellulose ether with caustic soda solution of 18% and greater strength, but we realized nothing of value, as a highly viscous or gelatinous coating quickly developed over the particles or fibers of ether and thus gave rise to a mass of gel-like consistency consisting essentially of unpenetrated particles or fibers of ether aggregated as semi-dry bunches.

We have found, however, that it is possible to produce the desired solution of hydroxy-cellulose ether, without going to the trouble and expense of freezing the ether in admixture with caustic soda solution and thawing the mixture, by applying to the ether strong caustic soda solution at elevated temperature, removing excess solution from the ether preferably at such elevated temperature, and finally diluting the caustic soda-cellulose ether mixture with water and cooling the mixture to room temperature or thereabout. Thus, we have found that when the ether is treated with caustic soda solution of about 18% or greater strength at a temperature of about 50° to 100° C., not only is there practically no gel formation on the particles or fibers of ether, but the solution penetrates substantially uniformly into and throughout the mass of ether. Once such penetration of the mass of ether has been effected, we have found that it is possible to process the ether so as to produce a substantially clear, fluent, and stable solution of the desired ether concentration. Thus, excess strong caustic soda solution may be drained or squeezed from the ether until the mass has the desired alkali content, whereupon the mass may then be mixed with diluting water in amount designed to lead to a solution of the desired ether and alkali concentration. The ether dissolves in the dilute alkali solution at room temperature or thereabout to form a substantially clear, fluent solution of good stability, that is, a solution that retains its fluency for a sufficiently long period of time to fit into the usual schedule of manufacturing transparent films, artificial silk, and coated or impregnated products.

While not limited thereto, we shall now describe how the principles of our invention may be applied to hydroxy-cellulose ethers prepared in sheet form. Thus, the sheets may consist of cellulose fiber that has undergone etherification with, say, up to about 15% of ethylene oxide, based on the weight of fiber, to form the hydroxy ethyl ether of cellulose. It is generally most feasible to perform the etherification on bulk cellulose fiber and then to fabricate the etherified fiber into porous sheets of, say, 1 to 40 mills in thickness, by usual paper-making practice. Preferably the sheets are of a compactness ranging from, say, 40 to 80, as such sheets can readily be penetrated by caustic soda solution of 18% or greater strength at elevated temperature. The values of compactness herein given are obtained by dividing the basis weight of the sheets in pounds by the thickness in inches and multiplying by the factor $10^{-2}$. The expression "basis weight" as known in paper-making circles represents the weight in pounds of 480 sheets whose dimensions are 24 x 36 inches, this being equivalent to 2880 square feet of sheet material. In other words, the compactness value really represents the weight of fiber per unit volume of sheet material.

The sheets of etherified fiber are dipped in preheated caustic soda solution of, say, about 18% strength, the temperature of the solution being, say, 50° to 100° C. After the sheets have been substantially uniformly soaked or saturated with the solution, they may be drained free of excess solution. When free drainage is practiced with the solution at elevated temperature, it is unnecessary to resort to any squeezing of the sheets to reduce the alkali therein to the amount desired for promoting a solution of the ether. Thus, the sheets may be drained after they have been removed from the steeping bath of hot caustic soda solution until their cellulose ether to caustic soda ratio has been reduced to about 1 to 1. After the sheets have been dipped in the hot caustic liquor and drained free of excess or drainable liquor, we have found it advantageous to cool the sheets before they are added to the cold diluting water used as the solvent medium. When the sheets containing the 18% caustic soda solution are cooled, swelling of the etherified fibers of which they are composed takes place, since they are thereby caused to enter a temperature range at which the solution has mercerizing activity and hence exerts a marked swelling effect upon the fibers. The sheets retain their integrity so as to permit of handling and transfer without difficulty to the solvent aqueous medium. The sheets may be cooled to a temperature of, say, 15° to 20° C., preparatory to their being mixed with the solvent aqueous medium. The drained sheets are then disintegrated in diluting water in amount calculated to produce a solution having an ether and caustic soda concentration of, say, about 7% each. If desired, however, the drained sheets, prior to dilution with water, may consist of about 18% cellulose ether, about 15% caustic soda, and about 67% water, in which case, sufficient diluting water may be used in their disintegration to eventuate in a solution of about 8% ether concentration and about 6½% caustic soda concentration, which solution corresponds to that usually prepared by other practices. Final dilution and mixing of the caustic soda-cellulose ether mixture with the diluting water is carried out at about room temperature, say, 20° C., under which conditions the ether dissolves to form the desired substantially clear, fluent, and stable solution. If desired, the dilution and mixing may be carried out at below room temperature, say, at 12° C., but it is unnecessary to go anywhere near the freezing temperature of the diluted caustic soda solution in order to dissolve the cellulose ether substantially in entirety.

It is unnecessary that draining of the sheets in the foregoing example be carried out with the solution at elevated temperature, for draining of the sheets at room temperature usually also permits of the elimination of the unnecessary or excess caustic soda solution. In some instances, however, it may be necessary to press the sheets free of the last portion of excess caustic soda solution, as when the solution has been permitted to cool in the sheets. After the excess caustic soda solution has been drained and/or squeezed from the sheets, it may be distinctly desirable to age the sheets in the presence of air, oxygen, or other oxidizing atmosphere, as such ageing results in a lowering of the solution viscosity of the ether such as may be particularly desired when the ether is of high solution viscosity. By varying the time of such ageing and/or the composition of the ageing media with which the sheets of alkali-cellulose ether are made to contact, it is possible to control the viscosity of the solution prepared from the aged cellulose ether and thereby to produce a solution best fitted for the particular manufacturing process into which the solution is to enter. Thus, the ageing sheets of alkali-cellulose ether that are to be dissolved to form a coating solution may be quite drastic, for instance, be carried on for some days and/or at elevated temperature, as in such case, it is desirable that the solution be of high fluency and thus lend itself to easy spreading as a coating of even or uniform thickness. The process of the present invention thus lends itself to application to cellulose ethers that have been prepared from cellulose fiber having a so-called cuprammonium viscosity considerably higher than the cellulose fiber or base stock ordinarily used in preparing the ethers. Thus, we may use refined wood pulps or cotton of comparatively high solution viscosity, that is, cellulose fibers that have not been subjected to special processing designed to lower the solution viscosity of the cellulose preparatory to the step of etherification.

If desired, the strong, hot solution of caustic soda applied to the sheets of etherified fiber may contain an oxidant, such as hydrogen peroxide, sodium peroxide, sodium hypochlorite, etc., so as to promote a marked lowering of the solution viscosity of the fiber. An oxidant may thus be used in lieu of ageing the alkali-cellulose ether, as either expedient leads to a marked lowering of the solution viscosity of the ether. In some instances, both expedients may be adopted in arriving at an ether of the desired low solution viscosity; that is, an oxidant may be used in the strong, hot solution of caustic soda applied to the etherified fiber and the alkali-ether mixture may be aged in an oxidizing atmosphere, as hereinbefore described.

Our process may, of course, be applied to cellulose ethers that have been prepared in shredded or fluffed form, in which case, the voluminosity or bulkiness of a mass of ether is such that it tends to retain even after long period of drainage more strong caustic soda solution than that desirable or necessary for dissolving the ether. In such case, it may be necessary to squeeze from the mass the last undesirable or excess portion of the strong caustic soda solution before the alkali-cellulose ether is diluted with water and dissolved at the appropriate temperature conditions. In treating cellulose ether in shredded or fluffed form, it is also indispensable to the present invention that the strong caustic soda solution used in the treatment be at elevated temperature, that is, at a temperature above at least about 50° C., in order to ensure the desired substantially uniform penetration with such solution of the shredded or fluffed mass of ether, that is, without developing on the particles or fibers of ether the highly viscous or gelatinous coating that would protect such particles or fibers against the desired penetration. In processing shredded or fluffed ether in accordance with our invention, we may dump the mass of shreds or fluff into the hot, strong caustic soda solution and effect a mixing action until the desired uniform saturation of the particles or fibers of ether with the solution has been effected. The mass may then be centrifuged or pressed free of excess solution, cooled, and then diluted with water at seasonable temperature, say, 15° to 20° C., to produce the desired kind of ether solution. As already indicated, the alkali-containing sheds of ether may advantageously be cooled to say, 15° to 20° C., before mixing with the diluting water. If desired, the diluting water may be refrigerated to, say, 5° to 10° C., and mixed with the centrifuged mass after such mass has been cooled to, say, room temperature, the resulting ether solution having a temperature of, say, 10° to 20° C.

In treating the cellulose ether with caustic soda solution, it is unnecessary that the ether be dry. Thus, in treating sheets of the ether, as hereinbefore described, it may, in fact, be desirable that the sheets be moist. Assuming that sheets of the ether have been dried substantially to completion, they may be humidified to a moisture content of, say, 7% to 10%, based on the weight of ether, whereby diffusion of the strong caustic soda solution into and throughout the sheets is promoted by such moisture. In some instances, a suitable so-called wetting-out agent may be added to the mass of cellulose ether and/or to the caustic soda solution to promote the desired uniform penetration of the mass with the caustic soda solution. What we have said applied to a mass of ether either in sheet form or in shredded or fluffed form.

We need not herein describe in detail the conditions under which the hydroxy-cellulose ethers which we process in accordance with our invention are prepared, as the particular mode of their preparation constitutes no part of the present invention. As already indicated, our invention is applicable to hydroxy-cellulose ethers, for instance, the hydroxy-alkyl ethers of cellulose that are prepared by etherifying cellulose fiber with ethylene oxide or homologous alkylene oxide under suitable conditions and to various combined alkylene oxide contents. While not limited thereto, our process is especially useful as applied to ethers of low combined alkylene oxide content, for instance, hydroxy-ethyl ethers of cellulose of a combined ethylene oxide content up to about 15%, based on the weight of the cellulose, as these are the most difficult ones to put into the desired kind of solution. Our process is also especially valuable as applied to ethers of high solution viscosity, as it enables a sharp reduction of their solution viscosity under controllable conditions and at low expense.

We claim:—

1. A process of dissolving a mass of hydroxy-cellulose ether in caustic soda solution which comprises saturating the mass of ether with a heated caustic soda solution of a strength such as would superficially gelatinize the ether at room temperature, said solution being heated sufficiently to have substantially no gelatinizing effect on the ether, and then causing a solution of the mass of caustic soda-ether mixture in the presence of diluting water at a temperature distinctly below such saturating temperature but above the freezing temperature of the resulting diluted caustic soda solution.

2. A process of dissolving a mass of hydroxy-cellulose ether in caustic soda solution which comprises saturating the mass of ether with a heated caustic soda solution of a strength such as would superficially gelatinize the ether at room temperature, said solution being heated sufficiently to have substantially no gelatinizing effect on the ether, ageing the resulting mass of caustic soda-ether mixture in an oxidizing atmosphere, and causing a solution of the aged mass in the presence of diluting water at a temperature distinctly below such saturating temperature but above the freezing temperature of the resulting diluted caustic soda solution.

3. A process of dissolving a mass of hydroxy-cellulose ether in caustic soda solution which comprises soaking the mass substantially uniformly with caustic soda solution of at least about 18% strength heated to a temperature of at least about 50° C., and then causing a solution of the mass of caustic soda-ether mixture in the presence of diluting water at a temperature distinctly below about 50° C. but above the freezing temperature of the resulting diluted caustic soda solution.

4. A process of dissolving a mass of hydroxy-cellulose ether in caustic soda solution which comprises soaking the mass substantially uniformly with caustic soda solution of at least about 18% strength heated to a temperature of at least about 50° C., draining from the soaked mass substantially all of the solution that drains freely therefrom, cooling the mass, and then causing a solution of the cooled mass of caustic soda-ether mixture in the presence of diluting water at a temperature distinctly below about 50° C. but above the freezing temperature of the resulting diluted caustic soda solution.

5. A process of dissolving a mass of hydroxycellulose ether in caustic soda solution which comprises soaking the mass substantially uniformly with caustic soda solution of at least about 18% strength containing an oxidant and heated to a temperature of at least about 50° C., removing only part of the solution from the soaked mass, cooling the mass, and then causing a solution of the cooled mass in the presence of diluting water at a temperature distinctly below 50° C. but above the freezing temperature of the resulting diluted caustic soda solution.

6. A process of dissolving a mass of hydroxycellulose ether in caustic soda solution which comprises soaking the mass substantially uniformly with caustic soda solution of at least about 18% strength heated to a temperature of at least about 50° C., removing only part of the solution from the soaked mass, ageing the mass in an oxidizing atmosphere, and causing a solution of the aged mass in the presence of diluting water at a temperature distinctly below about 50° C. but above the freezing temperature of the resulting diluted caustic soda solution.

7. A process of dissolving a mass of hydroxycellulose ether in caustic soda solution which comprises soaking the mass substantially uniformly with caustic soda solution of at least about 18% strength heated to a temperature of at least about 50° C., removing sufficient solution from the soaked mass to reduce its cellulose ether to caustic soda ratio to about 1 to 1, cooling the mass, and causing a solution of the cooled mass of caustic soda-ether mixture at a temperature of about 10° to 20° C. in the presence of sufficient diluting water to produce a solution having an ether and caustic soda concentration of about 7% each.

8. A process of dissolving sheets of hydroxycellulose ether which comprises saturating the sheets with a caustic soda solution of at least about 18% strength at a temperature ranging from about 50° to 100° C., removing sufficient solution from the sheets to lower their ether to caustic soda ratio to about 1 to 1, cooling the sheets, and disintegrating the cooled sheets and causing their solution at a temperature of about 10° to 20° C. in the presence of sufficient diluting water to produce a solution of an ether and caustic soda concentration of about 7% each.

9. A process of dissolving sheets of hydroxycellulose ether which comprises saturating the sheets with a caustic soda solution of at least about 18% strength at a temperature ranging from about 50° to 100° C., removing sufficient solution from the sheets to lower their ether to caustic soda ratio to about 1 to 1, ageing the sheets in an oxidizing atmosphere, and disintegrating the aged sheets and causing their solution at a temperature of about 10° to 20° C. in the presence of sufficient diluting water to produce a solution of an ether and caustic soda concentration of about 7% each.

10. A process which comprises etherifying a mass of cellulose with ethylene oxide to produce a hydroxy ethyl ether of cellulose having a combined ethylene oxide content up to about 15%, based on the weight of the cellulose, soaking the etherified mass substantially uniformly with caustic soda solution of at least about 18% strength heated to a temperature of at least about 50° C., cooling the mass, and causing a solution of the cooled mass of caustic soda-ether mixture in the presence of diluting water at a temperature distinctly below 50° C. but above the freezing temperature of the resulting diluted caustic soda solution.

11. A process which comprises soaking porous sheets of a hydroxy ethyl ether of cellulose having a combined ethylene oxide content up to about 15% with a caustic soda solution of at least about 18% strength heated to a temperature ranging from about 50° to 100° C., removing sufficient solution from the sheets to lower their ether to caustic soda ratio to about 1 to 1, cooling the sheets, and disintegrating the cooled sheets and causing their solution at a temperature of about 10° to 20° C. in the presence of sufficient diluting water to produce a solution of an ether and caustic soda concentration of about 7% each.

GEORGE A. RICHTER.
HAROLD P. VANNAH.
DOUGLAS H. McMURTRIE.